United States Patent
Shimada

(10) Patent No.: US 10,708,501 B2
(45) Date of Patent: Jul. 7, 2020

(54) PROMINENT REGION DETECTION IN SCENES FROM SEQUENCE OF IMAGE FRAMES

(71) Applicant: SONY CORPORATION, Tokyo (JP)

(72) Inventor: Junji Shimada, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/162,853

(22) Filed: Oct. 17, 2018

(65) Prior Publication Data

US 2020/0128183 A1    Apr. 23, 2020

(51) Int. Cl.
| | |
|---|---|
| *H04N 5/232* | (2006.01) |
| *G06T 7/215* | (2017.01) |
| *G06T 7/223* | (2017.01) |
| *G06K 9/32* | (2006.01) |

(52) U.S. Cl.
CPC ....... *H04N 5/23258* (2013.01); *G06K 9/3233* (2013.01); *G06T 7/215* (2017.01); *G06T 7/223* (2017.01); *H04N 5/23254* (2013.01)

(58) Field of Classification Search
CPC ........ G06T 7/194; G06T 7/136; G06T 7/215; G11B 7/194; G11B 27/031; G06K 9/00751; G06K 9/00758; H04N 5/144; H04N 9/646
USPC ........... 348/294, 699, 208.2, 208.12, 208.14; 396/50, 53
See application file for complete search history.

(56) References Cited

U.S. PATENT DOCUMENTS

| | | | |
|---|---|---|---|
| 7,447,337 B2 | 11/2008 | Zhang et al. | |
| 2006/0133785 A1 | 6/2006 | Ko et al. | |
| 2007/0040805 A1* | 2/2007 | Mellot | G06F 3/0317 345/166 |
| 2010/0020210 A1* | 1/2010 | Tsunekawa | H04N 5/232 348/294 |
| 2016/0027325 A1* | 1/2016 | Malhotra | G06F 19/3481 434/252 |

(Continued)

OTHER PUBLICATIONS

Wedel, et al., "Detection and Segmentation of Independently Moving Objects from Dense Scene Flow", International Workshop on Energy Minimization Methods in Computer Vision and Pattern Recognition, pp. 14-27.

(Continued)

*Primary Examiner* — Xi Wang
(74) *Attorney, Agent, or Firm* — Chip Law Group

(57) ABSTRACT

An electronic device comprises an image sensor that captures a sequence of image frames of a scene. The electronic device includes circuitry that generates an optical flow map for a current frame of the sequence of image frames received from the image sensor. The circuitry determines a plurality of likelihood-of-prominence values for the plurality of regions, based on the generated optical flow map and a motion vector that maps to a direction of motion of the electronic device. The circuitry is configured to detect at least a first region that has a direction of motion similar to that of the electronic device, as a region-of-prominence, based on the determined plurality of likelihood-of-prominence values for the plurality of regions. The circuitry is configured to track the desired object in the sequence of image frames based on the detection of the first region of the current frame as the region-of-prominence.

20 Claims, 9 Drawing Sheets

(56) References Cited

U.S. PATENT DOCUMENTS

2018/0293735 A1* 10/2018 Li .......................... G06T 7/194

OTHER PUBLICATIONS

Denman, et al., "An Adaptive Optical Flow Technique for Person Tracking Systems", Pattern Recognition Letters, vol. 28, Issue 10, Jul. 15, 2007, pp. 1232-1239.

* cited by examiner

PROMINENT REGION DETECTION IN SCENES FROM SEQUENCE OF IMAGE FRAMES

CROSS-REFERENCE TO RELATED APPLICATIONS/INCORPORATION BY REFERENCE

None.

FIELD

Various embodiments of the disclosure relate to an electronic device for object tracking. More specifically, various embodiments of the disclosure relate to an electronic device for prominent region detection in a scene from a sequence of image frames.

BACKGROUND

Recent advancements in the field of image processing have led to a development of various methods and techniques for extraction of moving objects from image frames. A conventional electronic device (such as a camera) may extract the moving objects from a sequence of image frames exclusively based on optical flow information associated with each frame of the sequence of image frames. The conventional electronic device may determine the optical flow information based on differences between different regions of two successive frames in a sequence of image frames. The regions that have a net optical flow in two successive frames may be detected as moving objects that may be present in two successive frames.

In certain scenarios, it may be desirable to extract a moving object, which may be present in a first frame, but may be absent in the successive frame. For example, one or more moving objects (of the plurality of moving objects) in the current frame may occlude the moving object in the first frame. Hence, the optical flow information may lack details of optical flow for the moving object in successive frames, which may cause a difficulty to track or extract the moving object from the sequence of image frames. In other scenarios, a user may intend to capture a scene that includes a moving object in focus. In such a case, the user may point the conventional electronic device towards the moving object and further may change an orientation or a position of the conventional electronic device to capture and track the moving object. Currently, in such scenarios and cases, conventional electronic devices provide erroneous results and may focus on an undesired foreground or background region in presence of multiple moving objects or occluding objects in the scene.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device to track a desired object in a sequence of image frames based on optical flow information and motion sensor data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in an electronic device to track a desired object in a sequence of image frames based on optical flow information and motion sensor data. The electronic device may include an image sensor and a circuitry. The image sensor may be configured to capture a sequence of image frames of a scene. The sequence of image frames may include a current frame that may include a plurality of regions. The circuitry may be configured to detect a region (from the plurality of regions in the current frame), that has a direction of motion similar to that of the electronic device. The electronic device may be configured to detect the region as a region-of-prominence. The detected region-of-prominence may map to a desired object from a plurality of moving objects in the sequence of image frames. Hence, the electronic device may identify the desired object from the plurality of moving objects in the current frame, based on the detection of the region-ofprominence from the plurality of regions. A conventional electronic device may inefficiently identify the desired object from the plurality of moving objects in the current frame. Therefore, it may be advantageous that the electronic device may be configured to detect the region of the plurality of regions that has the direction of motion similar to the direction of motion of the electronic device.

Figure 1:
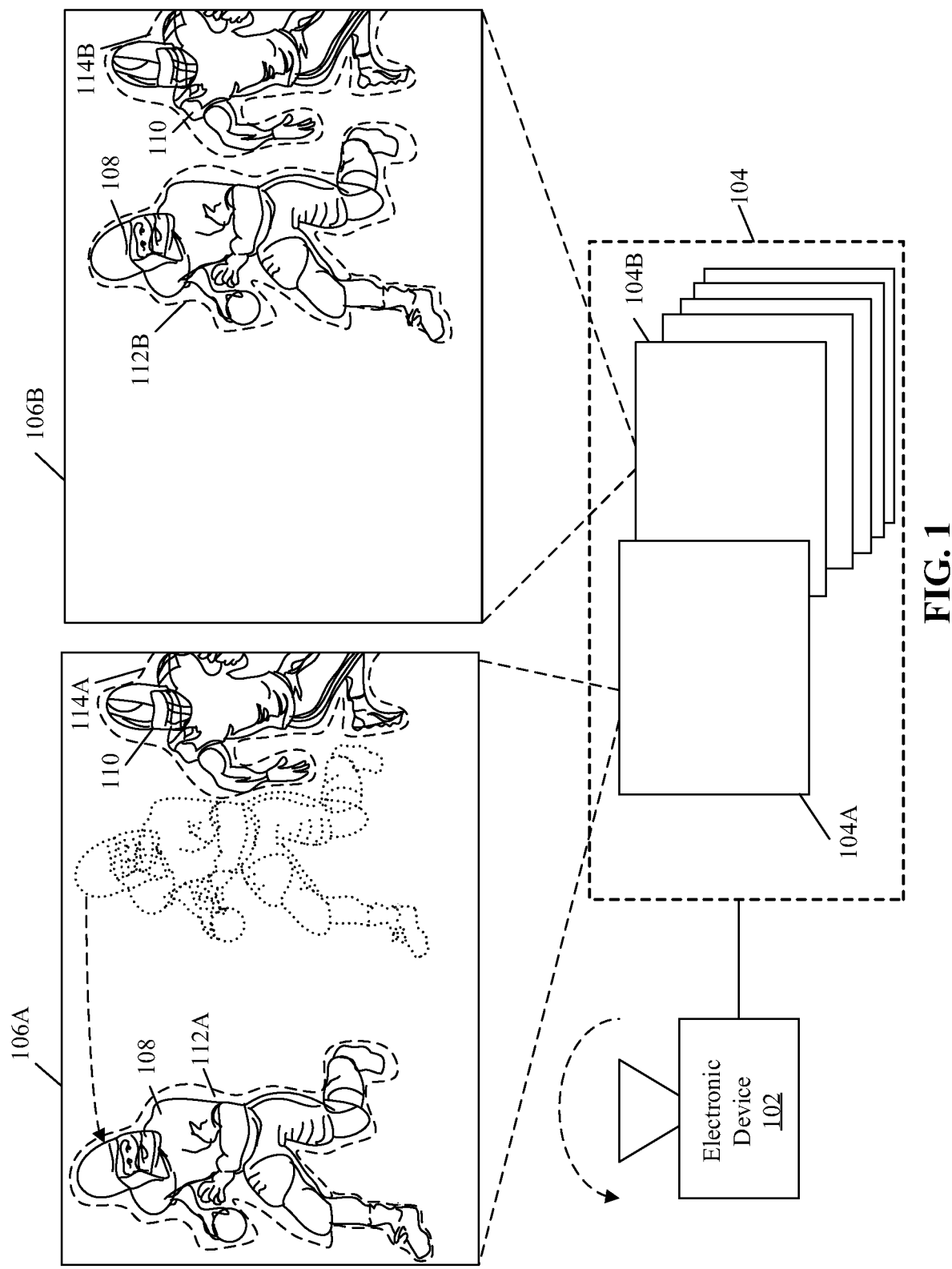
FIG. 1 is a block diagram that illustrates an exemplary environment for an electronic device to track a desired object in a sequence of image frames based on optical flow information and motion sensor data, in accordance with an embodiment of the disclosure.

FIG. 1 is a block diagram that illustrates an exemplary environment for implementation of an electronic device to track a desired object in a sequence of image frames based on optical flow information and motion sensor data, in accordance with an embodiment of the disclosure. With reference to FIG. 1, there is shown an operational environment 100 that includes an electronic device 102. The electronic device 102 may capture a sequence of image frames 104 that includes a current frame 104A and a previous frame 104B. There is further shown a first enlarged view 106A of the current frame 104A and a second enlarged view 106B of the previous frame 104B.

The electronic device 102 may comprise suitable logic, circuitry, and interfaces that may be configured to process one or more digital images and/or videos to track objects in the one or more digital images and/or videos. The electronic device 102 may be configured to capture the sequence of image frames 104. The electronic device 102 may be configured to extract one or more desired objects from the sequence of image frames 104. The electronic device 102 may further include a motion sensor to detect motion of the electronic device 102. Examples of the electronic device 102 may include, but are not limited to, an imaging device (such as a digital camera, a camcorder), a motion-capture system, a camera phone, a projector, a computer workstation, a mainframe computer, a handheld computer, a cellular/mobile phone, a smart appliance, a video player, a DVD writer/player, a television, and other computing devices.

In operation, the electronic device 102 may be pointed in a certain direction such that a scene that includes a plurality of moving objects may lie within a field-of-view (FOV) of the electronic device 102. The electronic device 102 may be utilized to capture the sequence of image frames 104 of the scene in the FOV of the electronic device 102. In some embodiments, the sequence of image frames 104 may refer to a video of a scene as viewed from a viewfinder of an imaging device and captured by the electronic device 102. In other embodiments, the sequence of image frames 104 may be a set of distinct image frames captured in sequence after a specific time interval. The sequence of image frames 104 may include a plurality of regions, for example, a first region 112A, and a second region 114A of the current frame 104A and a first region 112B, and a second region 114B of the previous frame 104B.

The captured sequence of image frames 104 may include a plurality of moving objects engaged in motion (in same or different directions) in the scene within the FOV of the electronic device 102. For example, the current frame 104A and the previous frame 104B of two players engaged in motion in a football match. The first object 108 may be represented by the first region 112A of the current frame 104A, and by the first region 112B of the previous frame 104B. The second object 110 may be represented by the second region 114A of the current frame 104A, and by a second region 114B of the previous frame 104B. Each of the plurality of regions may include a plurality of points, for example, a plurality of points 116 on the first object 108 and the second object 110. Each point may correspond to a position of a pixel or a patch of pixels in the current frame 104A or the previous frame 104B of the sequence of image frames 104. Examples of the plurality of moving objects may include, but are not limited to a human object, an animal, or a non-human or inanimate object, such as a vehicle or a sports item.

In accordance with an embodiment, the electronic device 102 may be configured to acquire velocity information (angular or linear) of the electronic device 102 as the user changes at least one of an orientation, position, altitude, or speed of movement of the electronic device 102. The electronic device 102 may be configured to compute a motion sensor-based motion vector associated with the electronic device 102, based on the obtained velocity information. The velocity information of the electronic device 102 may be acquired from a motion sensor of the electronic device 102. The motion sensor included in the electronic device 102 may correspond to a gyroscope based sensor. The electronic device 102 may be configured to generate an optical flow map of the current frame 104A of the sequence of image frames 104. The optical flow map may be generated based on a difference of pixel values of a plurality of pixels in a region of the current frame 104A and a corresponding region of the previous frame 104B of the sequence of image frames 104.

In accordance with an embodiment, the electronic device 102 may be configured to compute an optical flow-based motion vector associated with the electronic device 102 based on the generated optical flow map. The optical flow-based motion vector may indicate a direction and a rate of motion of the electronic device 102 as at least one of an orientation, position, altitude, or speed of movement of the electronic device 102 is changed (e.g. by a user). The electronic device 102 may be configured to compute a motion vector associated with the electronic device 102 based on the optical flow-based motion vector and the motion sensor-based motion vector. Such computed motion of the electronic device 102 may be represented by an expression (1), given as follows:

$$\text{Movement}_{Camera} = \overrightarrow{V}_{Cam} \quad (1)$$

In accordance with an embodiment, the generated optical flow map may include a plurality of regions (such as the first region 112A and the second region 114A), which may correspond to the plurality of moving objects captured in the sequence of image frames 104. The electronic device 102 may be configured to extract one or more motion vectors associated with each of the plurality of regions, from the generated optical flow map. For example, the electronic device 102 may be configured to extract a plurality of motion vectors from the generated optical flow map. The one or more motion vectors associated with a region of the plurality of regions may indicate a relative motion of the respective region in comparison with other regions of the plurality of regions. For example, the plurality of motion vectors may include a set of motion vectors associated with the first region 112A.

The set of motion vectors may indicate a relative motion of the first region 112A with respect to other regions of the plurality of regions. Such computation of the plurality of motion vectors associated with each of the plurality of regions from the current frame 104A may be determined based on various techniques that may be known to one skilled in the art. Examples of such techniques may include, but are not limited to, a sum of absolute difference (SAD) technique, a sum of squared difference (SSD) technique, a weighted sum of absolute difference (WSAD) technique, and/or a weighted sum of squared difference (WSSD) technique. Notwithstanding, other techniques that may be known to one skilled in the art may be implemented for computation of the relative movement between each of the plurality of regions, without a deviation from the scope of the disclosure. Such computed relative motion of each of the plurality of regions may be represented by an expression (2), given as follows:

$$\text{Movement}_{region} = \vec{V}_{rel} \qquad (2)$$

In accordance with an embodiment, the electronic device 102 may be configured to compute an angle between the motion vector associated with the electronic device 102 and each of the plurality of motion vectors of the plurality of regions. In certain scenarios, the electronic device 102 may be configured to compute a vector sum of the motion vector associated with the electronic device 102 with each of the plurality of motion vectors of the plurality of regions. For example, the electronic device 102 may be configured to compute a first angle between the motion vector associated with the electronic device 102 and a first motion vector associated with the first region 112A. The first angle may be computed based on a first vector sum of the motion vector associated with the electronic device 102 and the first motion vector associated with the first region 112A. Such computed vector sum of each of the plurality of motion vectors and the motion vector associated with the electronic device 102 may be represented by an expression (3), given as follows:

$$\vec{V}_{abs\_region} = \vec{V}_{Cam} + \vec{V}_{rel} \qquad (3)$$

The electronic device 102 may be configured to determine whether a computed angle between a motion vector associated with the electronic device 102 and a motion vector associated with a region in the current frame 104A is greater than a threshold value of angle. In a case where the computed angle is less than the threshold value of angle, the region associated with the computed angle may be marked as non-prominent region. Otherwise, the electronic device may further compute likelihood-of-prominence values for different regions of the current frame 104A.

In accordance with an embodiment, the electronic device 102 may be configured to compute a plurality of inner products between the motion vector associated with the electronic device 102 and each of the plurality of motion vectors. In certain scenarios, the electronic device 102 may be configured to compute a plurality of inner products between the motion vector associated with the electronic device 102 and one or more computed vector sums between the motion vector associated with the electronic device 102 and the plurality of motion vectors associated with the plurality of regions in the current frame 104A. The electronic device 102 may be configured to determine likelihood-of-prominence values associated with each region of the plurality of regions based on the computed inner product of one or more motion vectors associated with the respective region. The electronic device 102 may be configured to determine the likelihood-of-prominence values associated with each region of the plurality of regions further based on the computed degree-of-similarity associated with the respective region.

In accordance with an embodiment, the electronic device 102 may be further configured to compute a degree-of-similarity between the motion vector associated with the electronic device 102 and each of the plurality of motion vectors associated with a region of the plurality of regions. The electronic device 102 may be configured to compute the degree-of-similarity associated with each of the plurality of motion vectors (of the plurality of regions), based on a computed angle between the motion vector associated with the electronic device 102 and the respective motion vector.

In accordance with an embodiment, the electronic device 102 may be configured to compute a ratio between the motion vector associated with the electronic device 102 and each of the plurality of motion vectors associated with a specific region in the current frame 104A of the sequence of image frames 104. The electronic device 102 may be configured to compute the degree-of-similarity between the motion vector associated with the electronic device 102 and each of the plurality of motion vectors, further based on the computed ratio associated with the respective motion vector. The computed degree-of-similarity may indicate similarity of a direction of motion of the electronic device 102 with respect to a direction of motion of a region in the current frame 104A, associated with the respective motion vector.

In accordance with an embodiment, the electronic device 102 may be configured to detect a region (such as the first region 112A) of the plurality of regions that has the direction of motion similar to that of the electronic device 102. The electronic device 102 may be configured to mark the detected region as a region-of-prominence. For example, the electronic device 102 may be configured to detect the first region 112A as the region-of-prominence based on the set of motion vectors associated with the first region 112A and the motion vector associated with the electronic device 102. The first region 112A is associated with the first object 108 and therefore, the electronic device 102 may identify the first object 108 from the plurality of moving objects based on the detection of the first region 112A as the region-of-prominence.

In accordance with an embodiment, the electronic device 102 may be configured to detect the region-of-prominence, based on the determined likelihood-of-prominence values associated with each region of the plurality of regions. The electronic device 102 may be configured to detect a region of the plurality of regions as the region-of-prominence based on a highest value of the determined likelihood-of-prominence values associated with the region in comparison with remaining likelihood-of-prominence values that is associated with other regions of the plurality of regions. For example, the electronic device 102 may be configured to detect at least the first region 112A as the region-of-prominence based on a highest value of the determined likelihood-of-prominence of the first region 112A in comparison with remaining likelihood-of-prominence values that is associated with other regions of the plurality of regions. The electronic device 102 may be configured to detect the region-of-prominence from the plurality of regions further based on a defined set of criteria. The defined set of criteria that is utilized to detect the region-of-prominence has been explained in detail, for example, in FIGS. 3A, 3B, 3C, and 3D.

In accordance with an embodiment, the electronic device 102 may be configured to track a desired object (such as the first object 108) based on detection of the region-of-prominence from the plurality of regions. In cases where the first region 112A may be marked as the region-of-prominence, the electronic device 102 may be configured to track the first object 108 based on the detection of the first region 112A of the current frame 104A as the region-of-prominence.

In certain scenarios, the one or more moving objects (of the plurality of moving objects) in the current frame 104A may occlude a desired object (such as the first object 108) in the current frame 104A. Therefore, the desired object may be absent in the current frame 104A and present in the previous frame 104B. In such cases, the optical flow map of the current frame 104A may lack information associated with motion of the first object 108. Since, a conventional electronic device may track a desired object exclusively based on the optical flow map, the conventional electronic device may erroneously track the first object 108 for frames in which the desired object is absent. However, the disclosed electronic device 102 may track the desired object based on the optical flow map and the motion vector associated with the electronic device 102. The electronic device 102 may track the first object 108 continuously in successive frames of the captured sequence of image frames 104.

In accordance with an embodiment, the desired object (for example, the first object 108) may be tracked to automatically adjust a focus of the electronic device 102 (such as a camera) on the desired object (i.e. the first object 108). In other embodiments, the desired object may be tracked to segment the desired object from the sequence of image frames 104. The detailed operation of the electronic device 102 may be further described in detail, for example, in FIGS. 3A, 3B, 3C, and 3D.

Figure 2:
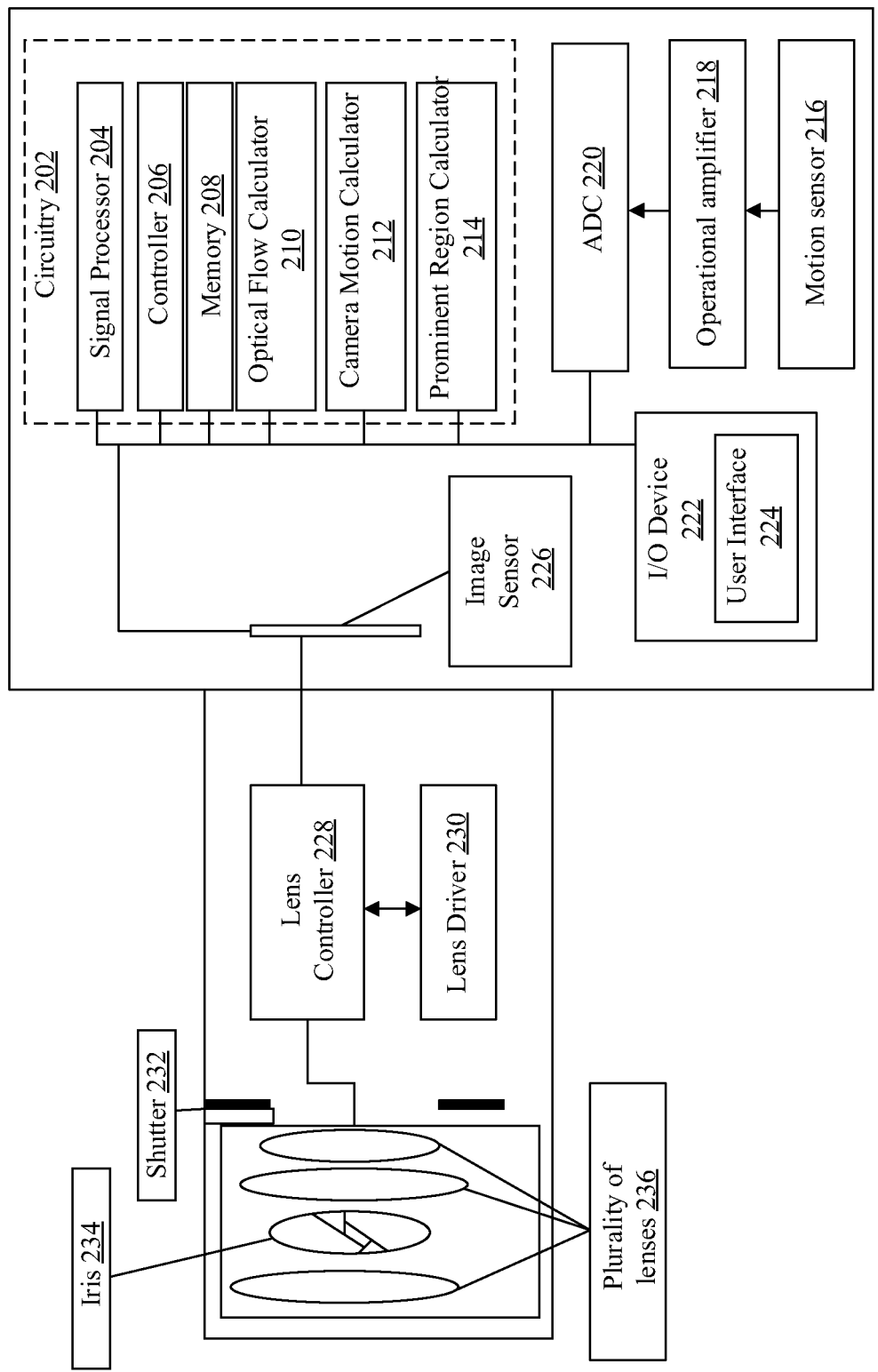
FIG. 2 is a block diagram that illustrates an exemplary electronic device to track a desired object in a sequence of image frames based on optical flow information and motion sensor data, in accordance with an embodiment of the disclosure.

FIG. 2 is a block diagram that illustrates an exemplary electronic device to track a desired object in a sequence of image frames based on optical flow information and motion sensor data, in accordance with an embodiment of the disclosure. FIG. 2 is explained in conjunction with elements from FIG. 1. With reference to FIG. 2, there is shown the electronic device 102. The electronic device 102 may include a circuitry 202. The circuitry 202 may include one or more processors, such as a signal processor 204, a controller 206, a memory 208, a camera motion calculator 212, an optical flow calculator 210, and a prominent region calculator 214. The electronic device 102 may further include a motion sensor 216, an operational amplifier 218, an analog-to-digital converter (ADC) 220, an input/output (I/O) device 222, and a user interface 224. The electronic device 102 may further include an optical circuitry that includes an image sensor 226, a lens controller 228, a lens driver 230, a shutter 232, an iris 234, and a plurality of lenses 236. The motion sensor 216, the I/O device 222, and the image sensor 226 may be communicatively connected to the circuitry 202. The plurality of lenses 236 may be in connection with the lens controller 228 and the lens driver 230. The plurality of lenses 236 may be controlled by the lens controller 228 in association with the circuitry 202.

The signal processor 204 may comprise suitable logic, circuitry, and interfaces that may be configured to execute a set of instructions stored in the memory 208. The signal processor 204 may be configured to receive the sequence of image frames 104 from the image sensor 226. In one example, the signal processor 204 may be an image processor. The signal processor 204 may be a specialized image processing application processor, implemented based on a number of processor technologies known in the art. Examples of the signal processor 204 may be an x86-based processor, a Reduced Instruction Set Computing (RISC) processor, an Application-Specific Integrated Circuit (ASIC) processor, a Complex Instruction Set Computing (CISC) processor, and/or other hardware processors.

The controller 206 may comprise suitable logic, circuitry, and interfaces that may be configured to execute a set of instructions stored in the memory 208. The controller 206 may be configured to receive one or more user inputs from a user via the user interface 224. Further, the controller 206 may be configured to store the sequence of image frames 104 received from the image sensor 226 in the memory 208. The controller 206 may be configured to display the sequence of image frames 104 to the user via the I/O device 222. Examples of the controller 206 may be a programmable logic controller (PLC), a microcontroller, an x86-based processor, a RISC processor, an ASIC processor, a CISC processor, and/or other hardware processors.

The memory 208 may comprise suitable logic, circuitry, and/or interfaces that may be configured to store a set of instructions executable by the signal processor 204, the controller 206, the camera motion calculator 212, the optical flow calculator 210, and the prominent region calculator 214. The memory 208 may be configured to store the sequence of image frames 104 (such as the current frame 104A and the previous frame 104B) captured by the image sensor 226 of the electronic device 102. The memory 208 may be further configured to store operating system data and associated application data for the electronic device 102. Examples of implementation of the memory 208 may include, but are not limited to, Random Access Memory (RAM), Read Only Memory (ROM), Hard Disk Drive (HDD), and/or a flash drive.

The optical flow calculator 210 may comprise suitable logic, circuitry, and/or interfaces that may be configured to receive from the memory 208, the sequence of image frames 104, captured by the image sensor 226. The optical flow calculator 210 may be further configured to generate an optical flow map based on the current frame 104A in the sequence of image frames 104 and an image frame (such as the previous frame 104B) that lies prior to the current frame 104A in the sequence of image frames 104. The optical flow calculator 210 may be configured to calculate the optical flow-based motion vector associated with the electronic device 102 based on the generated optical flow map. The optical flow calculator 210 may be configured to compute a plurality of motion vectors associated with a plurality of regions of the current frame 104A, based on the generated optical flow map. Examples of the optical flow calculator 210 may include an x86-based processor, a RISC processor, an ASIC processor, a CISC processor, and/or other hardware processors. The optical flow calculator 210 may be implemented as a separate processor or circuitry (as shown) in the electronic device 102. In accordance with an embodiment, the optical flow calculator 210 and the signal processor 204 may be implemented as an integrated processor or a cluster of processors that perform the functions of the optical flow calculator 210 and the signal processor 204.

The camera motion calculator 212 may comprise suitable logic, circuitry, and/or interfaces that may be configured to receive from the motion sensor 216, velocity information of the electronic device 102, such as angular velocity information and linear velocity information. The camera motion calculator 212 may be configured to compute a motion sensor-based motion vector associated with the electronic device 102, based on the received velocity information. The camera motion calculator 212 may be further configured to compute the motion vector associated with the electronic device 102 based on the optical flow-based motion vector and the motion sensor-based motion vector. Examples of the camera motion calculator 212 may include an x86-based processor, a RISC processor, an ASIC processor, a CISC processor, and/or other hardware processors. The camera motion calculator 212 may be implemented as a separate processor or circuitry (as shown) in the electronic device 102. In accordance with an embodiment, the camera motion calculator 212 and the signal processor 204 may be implemented as an integrated processor or a cluster of processors that perform the functions of the camera motion calculator 212 and the signal processor 204.

The prominent region calculator 214 may comprise suitable logic, circuitry, and/or interfaces that may be configured to receive from the optical flow calculator 210, the generated optical flow map and the plurality of motion vectors associated with the plurality of regions. The prominent region calculator 214 may be configured to receive the motion vector associated with the electronic device 102 from the camera motion calculator 212. The prominent region calculator 214 may be configured to detect the region-of-prominence from the plurality of regions based on the plurality of motion vectors associated with the plurality of regions and the motion vector associated with the electronic device 102. Examples of the prominent region calculator 214 may include an x86-based processor, a RISC processor, an ASIC processor, a CISC processor, and/or other hardware processors. The prominent region calculator 214 may be implemented as a separate processor or circuitry (as shown) in the electronic device 102. In accordance with an embodiment, the prominent region calculator 214 and the signal processor 204 may be implemented as an integrated processor or a cluster of processors that perform the functions of the prominent region calculator 214 and the signal processor 204.

The motion sensor 216 may comprise suitable logic, circuitry, and interfaces that may be configured to detect movement (linear or angular) in a device, such as the electronic device 102. For example, the motion sensor 216 may be configured to detect velocity information the electronic device 102 as the different motion parameters (for example, an orientation, a height, or a position) of the electronic device 102 is changed by a user. Examples of implementation of the motion sensor 216 may include, but are not limited to, a gyroscope based sensor, an accelerometer, and/or the like.

The operational amplifier 218 may be configured may comprise suitable logic, circuitry, and interfaces that may be configured to amplify one or more input signals generated by the motion sensor 216. Examples of implementation of the operational amplifier 218 may include, but are not limited to, a field effect transistor (FET), a metal oxide semiconductor field effect transistor (MOSFET), a complementary metal oxide semiconductor field effect transistor (CMOS) and/or the like.

The ADC 220 may be configured may comprise suitable logic, circuitry, interfaces that may be configured to receive one or more analog signals from the motion sensor 216. The one or more analog signals may comprise angular velocity information associated with the electronic device 102. The ADC 220 may be configured to convert the one or more analog signals into digital signals. Examples of implementation of the ADC 220 may include, but are not limited to, a direct-conversion ADC, a parallel comparator ADC, a counter-type ADC, and/or the like.

The I/O device 222 may comprise suitable logic, circuitry, interfaces, and/or code that may be configured to receive an input from a user. The I/O device 222 may be further configured to provide an output to the user. The I/O device 222 may comprise various input and output devices that may be configured to communicate with the signal processor 204. The I/O device 222 may provide the user interface 224 (such as a touchscreen panel, a keypad, and a voice recognition based user interface) to the user. Examples of the input devices may include, but is not limited to, a touch screen, a keyboard, a mouse, a joystick, a microphone, and/or an image-capture device. Examples of the output devices may include, but is not limited to a liquid crystal display (LCD) screen and/or a speaker.

The image sensor 226 may comprise suitable circuitry and/or interfaces that may be configured to capture the sequence of image frames 104. Examples of implementation of the image sensor 226 may include, but are not limited to, a Charge-Coupled Device (CCD) image sensor and a Complementary Metal-Oxide-Semiconductor (CMOS) image sensor.

The lens controller 228 may comprise suitable logic, circuitry, and/or interfaces that may be configured to control various characteristics, such as zoom, focus, or the iris 234 or aperture, of the plurality of lenses 236. The lens controller 228 may internally be a part of an imaging unit of the electronic device 102 or may be a stand-alone unit, operational in conjunction with the controller 206. The lens controller 228 may be implemented by use of several technologies that are well known to those skilled in the art.

The lens driver 230 may comprise suitable logic, circuitry, and/or interfaces that may be configured to execute zoom and focus control and iris control, based on instructions received from the lens controller 228. The lens driver 230 may be implemented by use of several technologies that are well known to those skilled in the art.

The plurality of lenses 236 may correspond to an optical lens or assembly of lenses used in conjunction with a camera body and mechanism to capture images (such as the sequence of image frames 104) of objects (such as the first object 108). The plurality of lenses 236 may further include the iris 234. The shutter 232 may allow light to pass for a determined period, exposing the image sensor 226 to light in order to capture the sequence of image frames 104. The detailed operation of different components of the electronic device 102 has been further provided in detail, for example, in FIGS. 3A to 3F.

Figure 3A:
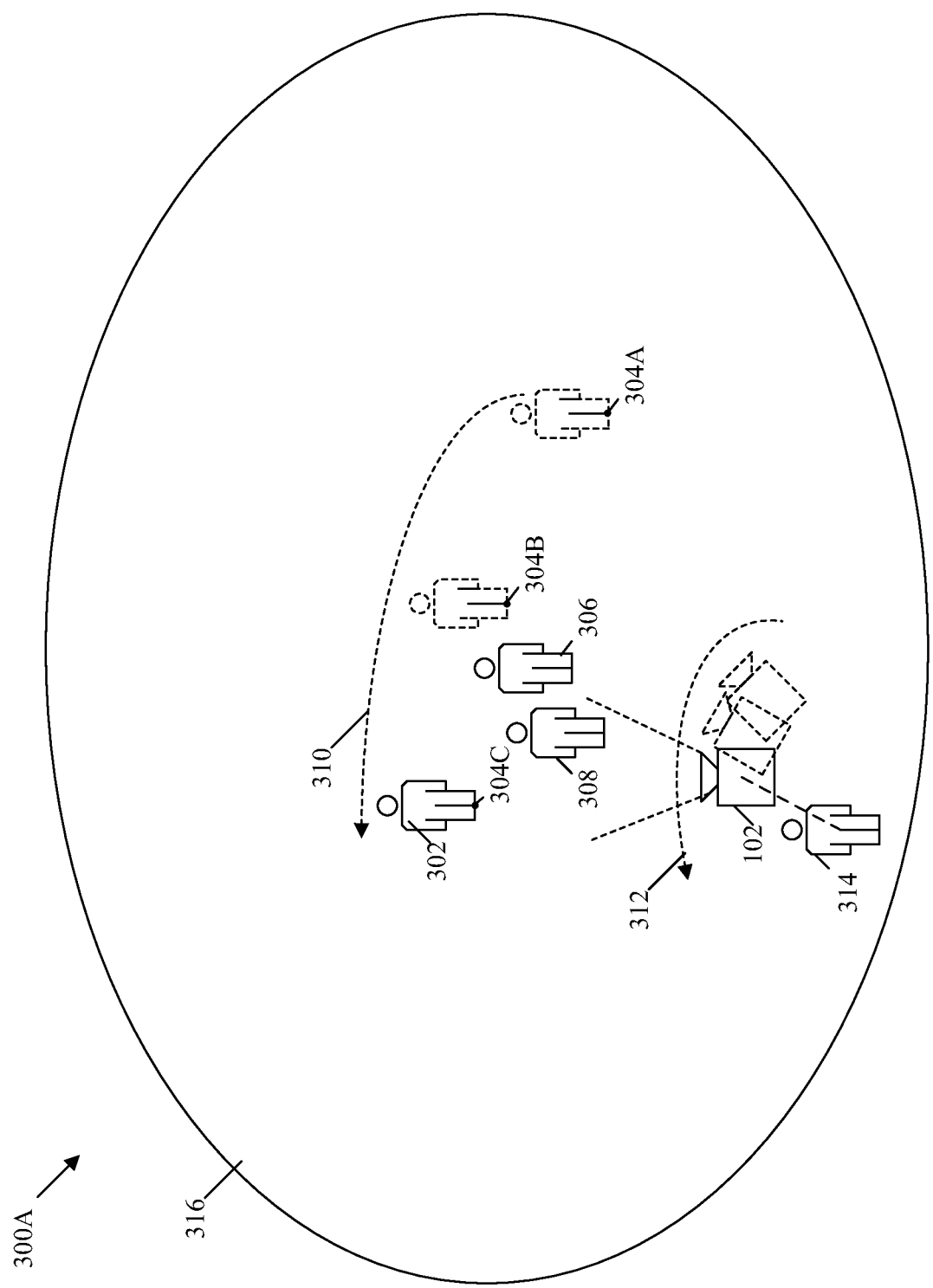
FIG. 3A illustrates a first exemplary scenario for implementation of electronic device to track a desired object in a sequence of image frames based on optical flow information and motion sensor data, in accordance with an embodiment of the disclosure.

FIG. 3A illustrates an exemplary scenario for implementation of electronic device to track a desired object in a sequence of image frames based on optical flow information and motion sensor data, in accordance with an embodiment of the disclosure. FIG. 3A is explained in conjunction with elements from FIG. 1 and FIG. 2. With reference to FIG. 3A, there is shown a scenario 300A (in a bird's eye view) that includes the electronic device 102, a plurality of objects that includes a first object 302, a second object 306, and a third object 308. The electronic device 102 may be operated by a user 314. The user 314 along with the electronic device 102, the first object 302, the second object 306, the third object 308, and may be located in a defined area 316. The first object 302 and the second object 306 may correspond to the first object 108 (of FIG. 1) and the second object 110 (of FIG. 1) respectively.

In accordance with the exemplary scenario, the plurality of moving objects may be engaged in motion within the defined area 316. The first object 302, which may be initially located at a first position 304A, may move to a second position 304B, and thereafter, to a third position 304C. The first object 302 may move in a first direction of motion (represented by a first arrow 310) to move from the first position 304A to the third position 304C within the defined area 316. In certain scenarios, the user 314 may intend to capture an object of the plurality of moving objects by use of the electronic device 102. The electronic device 102 may then be moved in a direction that follows the direction of motion of the object by the user. For example, the user 314 may desire to capture a view of the first object 302. In such a scenario, an orientation or a position of the electronic device 102 may be changed to include the first object 302 within a field-of-view of the electronic device 102. The user 314 may change orientation or position (horizontal or vertical) of the electronic device 102 in a second direction of motion (represented by a second arrow 312 in FIG. 3A). In cases where the first direction of motion is similar to the second direction of motion, the electronic device 102 may identify the first object 302 as an object, which may be captured by the electronic device 102.

Figure 3B:
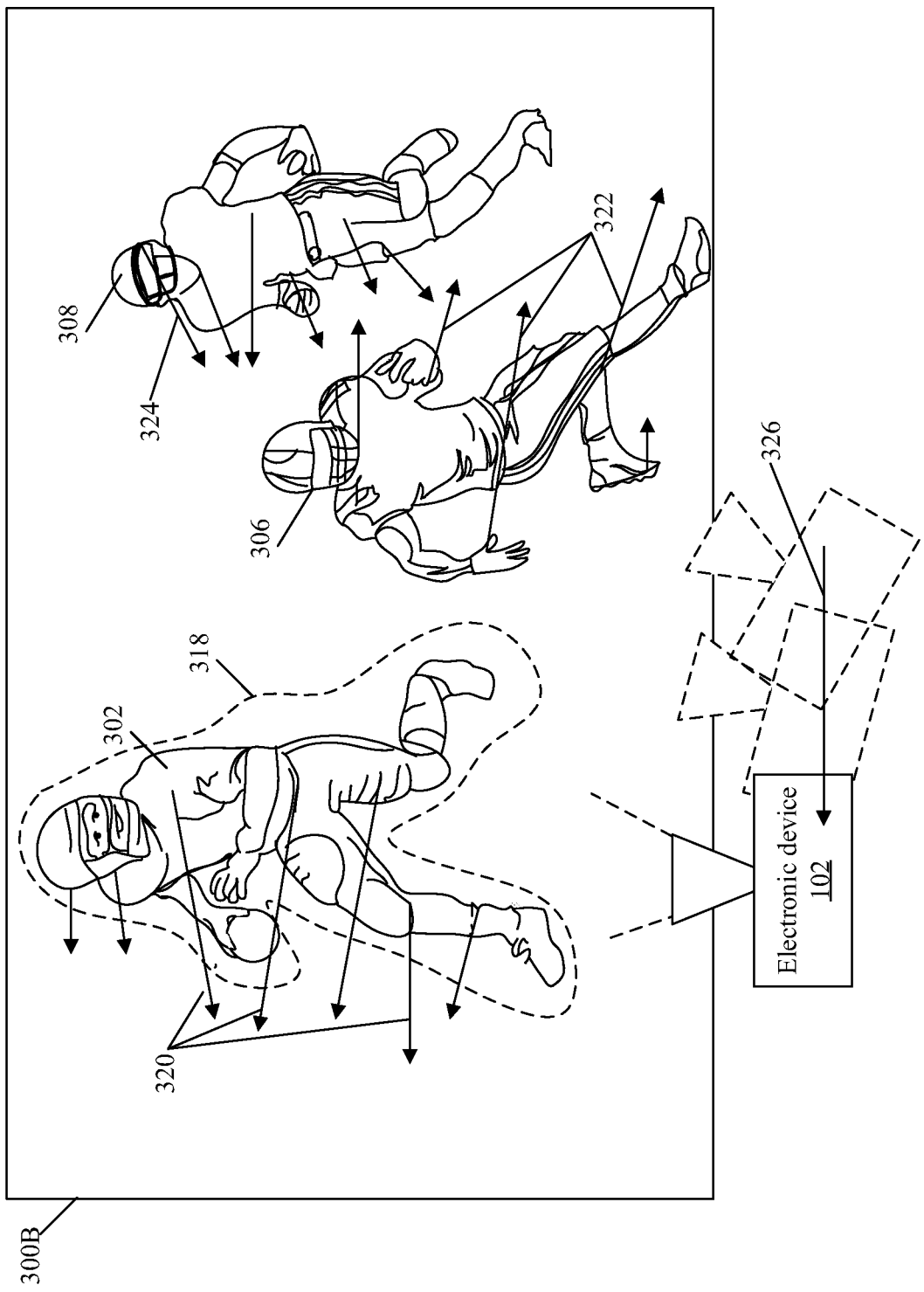
FIG. 3B illustrates a second exemplary scenario for implementation of electronic device to track a desired object in a sequence of image frames based on optical flow information and motion sensor data, in accordance with an embodiment of the disclosure.

FIG. 3B illustrates a second exemplary scenario for implementation of electronic device to track a desired object in a sequence of image frames based on optical flow information and motion sensor data, in accordance with an embodiment of the disclosure. FIG. 3B is explained in conjunction with elements from FIGS. 1, 2, and 3A. With reference to FIG. 3B, there is shown a current frame 300B (a specific example of the current frame 104A) of a sequence of image frames (such as the sequence of image frames 104) captured by the electronic device 102. The current frame 300B includes the first object 302, the second object 306 and the third object 308. The first object 302 may be represented in the current frame 104A as a first region 318. The first region 318 of the current frame 104A may correspond to the first region 112A (of FIG. 1).

In accordance with an embodiment, the electronic device 102 may be configured to generate the optical flow map associated with the current frame 300B (also discussed in FIG. 1). The electronic device 102 may be further configured to extract a plurality of motion vectors associated with each of a plurality of regions in the current frame 300B, based on the generated optical flow map. The plurality of regions may include the first region 318. For example, a first set of motion vectors (represented by a first set of arrows 320 as shown in FIG. 3B) may be associated with the first region 318 of the first object 302. Similarly, a second set of motion vectors (represented by a second set of arrows 322 as shown in FIG. 3B) and a third set of motion vectors (represented by a third set of arrows 324 as shown in FIG. 3B) may be associated with one or more regions. The one or more regions may represent the second object 306 and the third object 308 in the current frame 300B, respectively. The plurality of motion vectors (associated with a region of the plurality of regions) may indicate a relative motion of the respective region in comparison with other regions of the plurality of regions. For example, the first set of motion vectors (represented by the first set of arrows 320) may indicate a direction of motion of the first region 318 (and therefore, of the first object 302) with respect to other regions of the plurality of regions in the current frame 300B.

In accordance with an embodiment, the electronic device 102 may be further configured to compute a motion vector (represented by a first arrow 326 as shown in FIG. 3B) associated with the electronic device 102 based on the generated optical flow map (as discussed in FIG. 1). The motion vector (represented by the first arrow 326) may indicate a direction of motion of the electronic device 102 as an orientation or a position of the electronic device 102 is changed to capture motion of one or more desired objects (such as the first object 302). In cases where the direction of motion of a region of the plurality of regions is similar to the direction of motion of the electronic device 102, the electronic device 102 may detect the respective region as a region-of-prominence. For example, the direction of motion of the first region 318 may be similar to the direction of motion of the electronic device 102. In such cases, the electronic device 102 may detect the first region 318 as the region-of-prominence. The electronic device 102 may be configured to track the first object 302 in the sequence of image frames based on the detection of the first region 318 of the current frame 300B as the region-of-prominence.

Figure 3C:
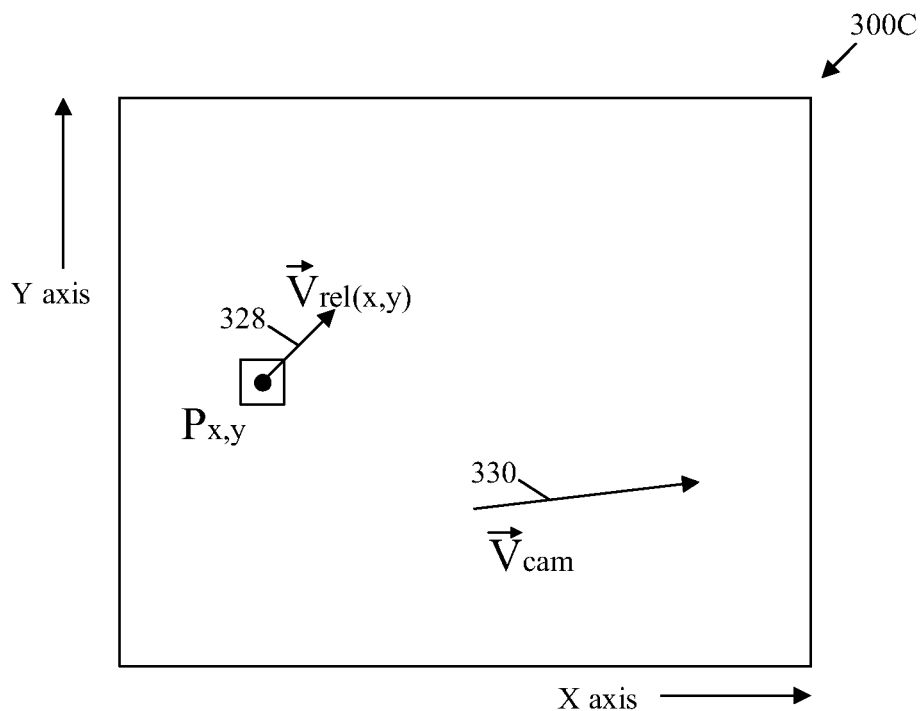
FIG. 3C is a first graph that illustrates a first motion vector associated with a region of a current frame of a sequence of image frames, and a second motion vector associated with an electronic device, in accordance with an embodiment of the disclosure.

FIG. 3C is a first graph that illustrates motion of a first motion vector associated with a region of a current frame of a sequence of image frames, and a second motion vector associated with an electronic device, in accordance with an embodiment of the disclosure. FIG. 3C is explained in conjunction with elements from FIGS. 1, 2, 3A, and 3B. With reference to FIG. 3C, there is shown a first graph 300C that depicts a first motion vector $\vec{V}_{rel}$ (represented by a graph component 328) and a second motion vector $\vec{V}_{Cam}$ (represented by a graph component 330) in a two dimensional "X"-"Y" plane. The first motion vector $\vec{V}_{rel}$ (represented by the graph component 328) may be indicative of motion of a first region P(x,y) (such as the first region 318 of FIG. 3B) of the plurality of regions, in the two dimensional "X"-"Y" plane. Similarly, the second motion vector $\vec{V}_{Cam}$ (represented by the graph component 330) may be indicative of the motion vector (represented by the first arrow 326 in FIG. 3B) of the electronic device 102 in the two dimensional "X"-"Y" plane. An "X" axis of the first graph 300C depicts displacement of the first region P(x,y) and the electronic device 102 in an "X" direction of the two dimensional "X"-"Y" plane. A "Y" axis of the first graph 300C depicts displacement of the first region P(x,y) and the electronic device 102 in a "Y" direction of the two dimensional "X"-"Y" plane.

Figure 3D:
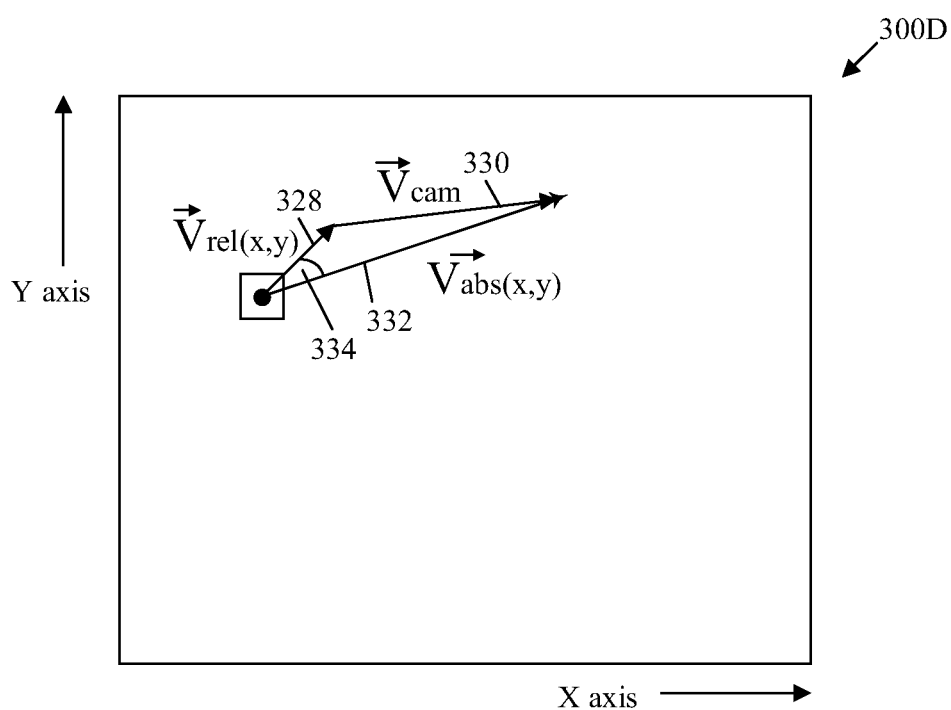
FIG. 3D is a second graph that illustrates a first motion vector associated with a region of a current frame of a sequence of image frames, and a second motion vector associated with an electronic device, in accordance with an embodiment of the disclosure.

FIG. 3D is a second graph that illustrates motion of a first motion vector associated with a region of a current frame of a sequence of image frames, and a second motion vector associated with an electronic device, in accordance with an embodiment of the disclosure. FIG. 3D is explained in conjunction with elements from FIGS. 1, 2, 3A, 3B, and 3C. With reference to FIG. 3D, there is shown a second graph 300D which depicts the first motion vector $\vec{V}_{rel}$ (represented by the graph component 328) and the second motion vector $\vec{V}_{Cam}$ (represented by the graph component 330) in the two dimensional "X"-"Y" plane. There is further shown a vector sum $\vec{V}_{abs\_region}$ (represented by a third graph component 332) of the first motion vector $\vec{V}_{rel}$ (represented by the graph component 328) and the second motion vector $\vec{V}_{Cam}$ (represented by the graph component 330).

The first motion vector $\vec{V}_{rel}$ (represented by graph component 328) may be indicative of motion of the first region P(x,y), in the two dimensional "X"-"Y" plane. Similarly, the second motion vector $\vec{V}_{Cam}$ (represented by graph component 330) may be indicative of motion of the electronic device 102 in the two dimensional "X"-"Y" plane. An "X" axis of the second graph 300D depicts displacement of the first region P(x,y) and the electronic device 102 in an "X" direction of the two dimensional "X"-"Y" plane. A "Y" axis of the first graph 300C depicts displacement of the first region P(x,y) and the electronic device 102 in a "Y" direction of the two dimensional "X"-"Y" plane.

In accordance with an embodiment, the electronic device 102 may be configured to compute an angle between the motion vector associated with the electronic device 102 and each of the plurality of motion vectors. For example, the electronic device 102 may be configured to compute an angle θ (represented by a fourth graph component 334) between the first motion vector $\vec{V}_{rel}$ (represented by graph component 328) and the second motion vector $\vec{V}_{Cam}$ (represented by graph component 330). Such computed angle θ (represented by the fourth graph component 334) between the first motion vector $\vec{V}_{rel}$ (represented by the graph component 328) and the second motion vector $\vec{V}_{Cam}$ (represented by the graph component 330) may be represented by the an expression (4), given as follows:

$$\theta = \cos^{-1}\left(\frac{\vec{V}_{abs\_region} \cdot \vec{V}_{Cam}}{|\vec{V}_{abs\_region}| \cdot |\vec{V}_{Cam}|}\right) \quad (4)$$

In accordance with an embodiment, the electronic device 102 may be configured to detect the first region P(x,y) as the region-of-prominence based on a defined set of criteria. The electronic device 102 may determine, as a first criterion of the defined set of criteria, whether the computed angle θ between the first motion vector $\vec{V}_{rel}$ (represented by the graph component 328) and the second motion vector $\vec{V}_{Cam}$ (represented by the graph component 330) is lesser than a first defined limit. In cases where the computed angle θ is lesser than the first defined limit, then the first region P(x,y), which may be associated with the first motion vector $\vec{V}_{rel}$ (represented by graph component 328), may be prominent. In such cases, the electronic device 102 may be configured to detect the first region P(x,y) as the region-of-prominence.

In accordance with an embodiment, the electronic device 102 may be configured to compute a set of inner products between the motion vector associated with the electronic device 102 and each of the plurality of motion vectors. For example, the electronic device 102 may be configured to compute an inner product $I_{region}$ between the first motion vector $\vec{V}_{rel}$ (represented by the graph component 328) and the second motion vector $\vec{V}_{Cam}$ (represented by graph component 330). Such computed inner product between the first motion vector $\vec{V}_{rel}$ (represented by the graph component 328) and the second motion vector $\vec{V}_{Cam}$ (represented by the graph component 330) may be represented by an expression (5), given as follows:

$$I_{region} = \vec{V}_{Cam} \cdot \vec{V}_{abs\_region} \quad (5)$$

In accordance with an embodiment, the electronic device 102 may determine, as a second criterion of the defined set of criteria, whether the computed inner product $I_{region}$ is greater than a first defined threshold. In cases where the computed inner product $I_{region}$ is greater than the first defined threshold, then the first region P(x,y), associated with the first motion vector $\vec{V}_{rel}$ (represented by the graph component 328), may be prominent. Hence, the electronic device 102 may be configured to detect the first region P(x,y) as a region-of-prominence.

In accordance with an embodiment, the electronic device 102 may be configured to compute a ratio between the motion vector associated with the electronic device 102 and each of the plurality of motion vectors. For example, the electronic device 102 may be configured to compute a ratio between the first motion vector $\vec{V}_{rel}$ (represented by the graph component 328) and the second motion vector $\vec{V}_{Cam}$ (represented by the graph component 330). In cases where the vector sum $\vec{V}_{abs\_region}$ (represented by the third graph component 332) may be greater than the second motion vector $\vec{V}_{Cam}$ (represented by the graph component 330), such computed ratio may be represented by an expression (6), given as follows:

$$\text{Ratio} = \frac{\vec{V}_{abs\_region}}{\vec{V}_{Cam}} \quad (6)$$

In cases where the vector sum $\vec{V}_{abs\_region}$ (represented by the third graph component 332) may be lesser than the second motion vector $\vec{V}_{Cam}$ (represented by the graph component 330), such computed ratio may be represented by an expression (7), given as follows:

$$\text{Ratio} = \frac{\vec{V}_{Cam}}{\vec{V}_{abs\_region}} \quad (7)$$

In accordance with an embodiment, the electronic device 102 may determine, as a third criterion of the defined set of criteria, whether the computed ratio may be greater than a first defined threshold and lesser than a second defined threshold. In cases where the computed ratio is greater than the first defined threshold and lesser than the second defined threshold, the first region P(x,y), which may be associated with the first motion vector $\vec{V}_{rel}$ (represented by the graph component 328), may be marked as prominent region. Therefore, the electronic device 102 may be configured to detect the first region P(x,y) as the region-of-prominence.

In accordance with an embodiment, the electronic device 102 may determine, as a fourth criterion of the defined set of criteria, whether the second motion vector $\vec{V}_{Cam}$ (represented by the graph component 330) may be greater than a third defined threshold. In cases where the second motion vector $\vec{V}_{Cam}$ (represented by the graph component 330) is greater than the third defined threshold, a region of the plurality of regions, which may be associated with the first motion vector $\vec{V}_{rel}$ (represented by the graph component 328), may be a prominent region. Therefore, the electronic device 102 may be configured to detect the first region P(x,y) as the region-of-prominence.

Figure 3E:
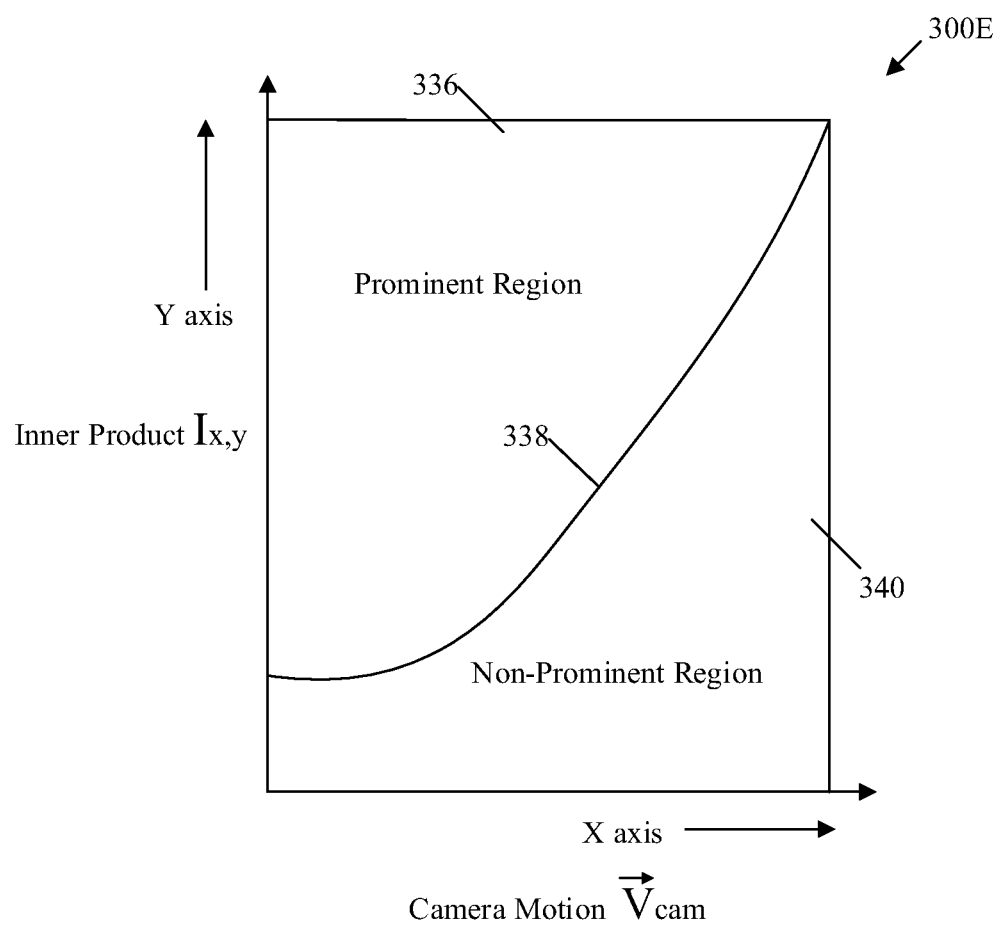
FIG. 3E is a third graph that illustrates variation of a computed inner product of a first motion vector and a second motion vector with respect to the second motion vector, in accordance with an embodiment of the disclosure.

FIG. 3E is a third graph that illustrates variation of a computed inner product of a first motion vector and a second motion vector with respect to the second motion vector, in accordance with an embodiment of the disclosure. FIG. 3E is explained in conjunction with elements from FIGS. 1, 2, 3A, 3B, 3C, and 3D. With reference to FIG. 3E, there is shown a third graph 300E that depicts variation of the inner product $I_{region}$ with respect to the second motion vector $\vec{V}_{Cam}$ (represented by the graph component 330 in FIG. 3D). An "X" axis of the third graph 300E depicts the inner product $I_{region}$. A "Y" axis of the third graph 300E depicts the second motion vector $\vec{V}_{Cam}$ (represented by the graph component 330 in FIG. 3D). The third graph 300E may include a prominent region 336 and a non-prominent region 340.

In accordance with an embodiment, the electronic device 102 may be further configured to determine whether the computed inner product $I_{region}$ associated with the first region P(x,y) is greater than a first defined threshold (represented by the graph component 338). In certain scenarios the computed inner product $I_{region}$ associated with the first region P(x,y) may be greater than the first defined threshold (represented by the graph component 338). In such cases, the electronic device 102 may be configured to detect the first region P(x,y) as the region-of-prominence. Alternatively stated, in cases where the computed inner product $I_{region}$ lies in the prominent region 336 the electronic device 102 may detect the first region P(x,y) as the region-of-prominence. In cases where the computed inner product $I_{region}$ associated with the first region P(x,y) is greater than the first defined threshold (represented by the graph component 338), the electronic device 102 may not detect the first region P(x,y) as the region-of-prominence. Alternatively stated, in cases where the computed inner product $I_{region}$ associated with the first region P(x,y) lies in the non-prominent region 340, the electronic device 102 may detect the first region P(x,y) as a non-prominent region.

Figure 4A:
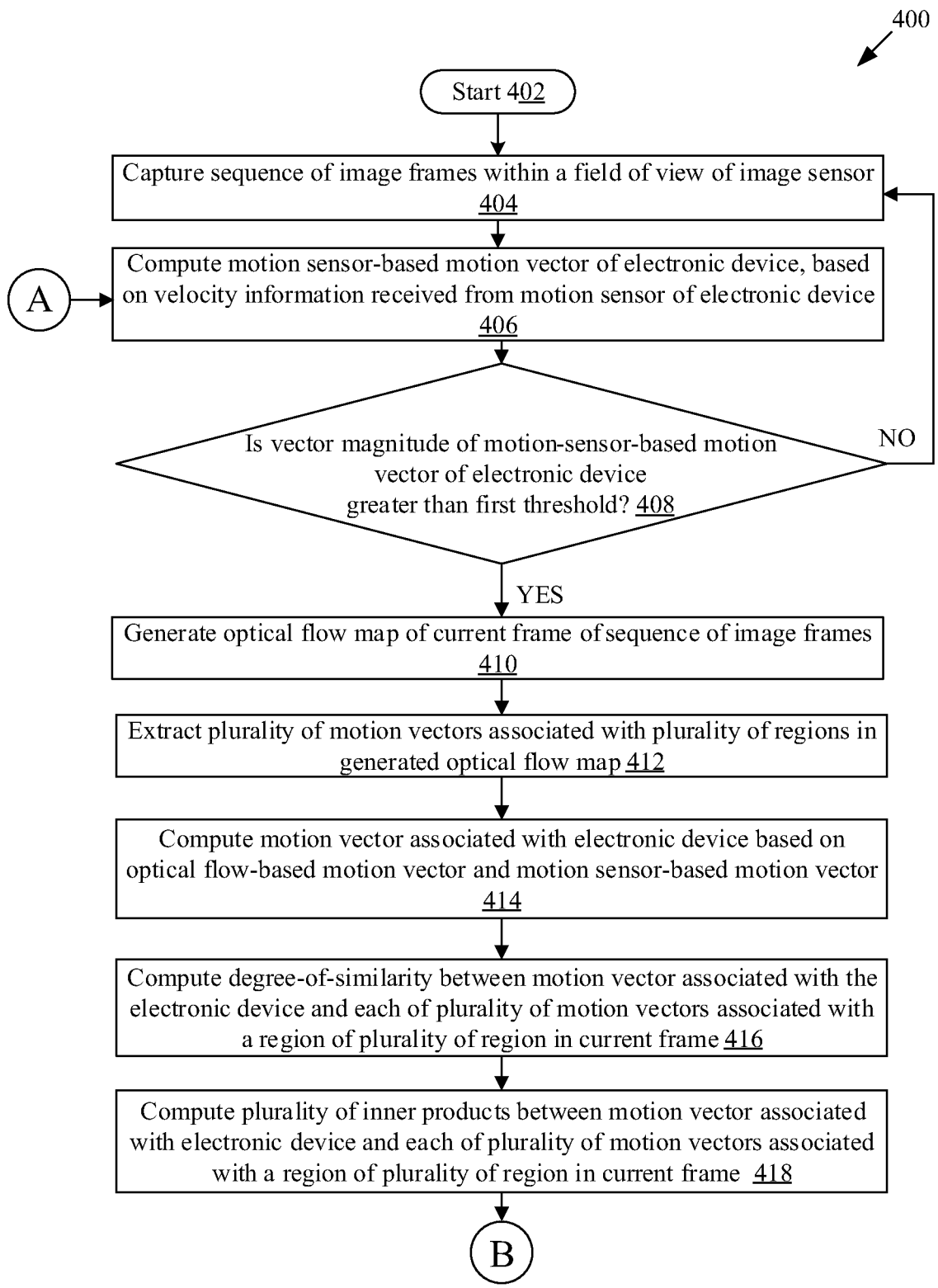
FIGS. 4A, 4B, and 4C, collectively, depict a flowchart that illustrates exemplary operations to track a desired object in a sequence of image frames based on optical flow information and motion sensor data, in accordance with an embodiment of the disclosure.
Figure 4B:
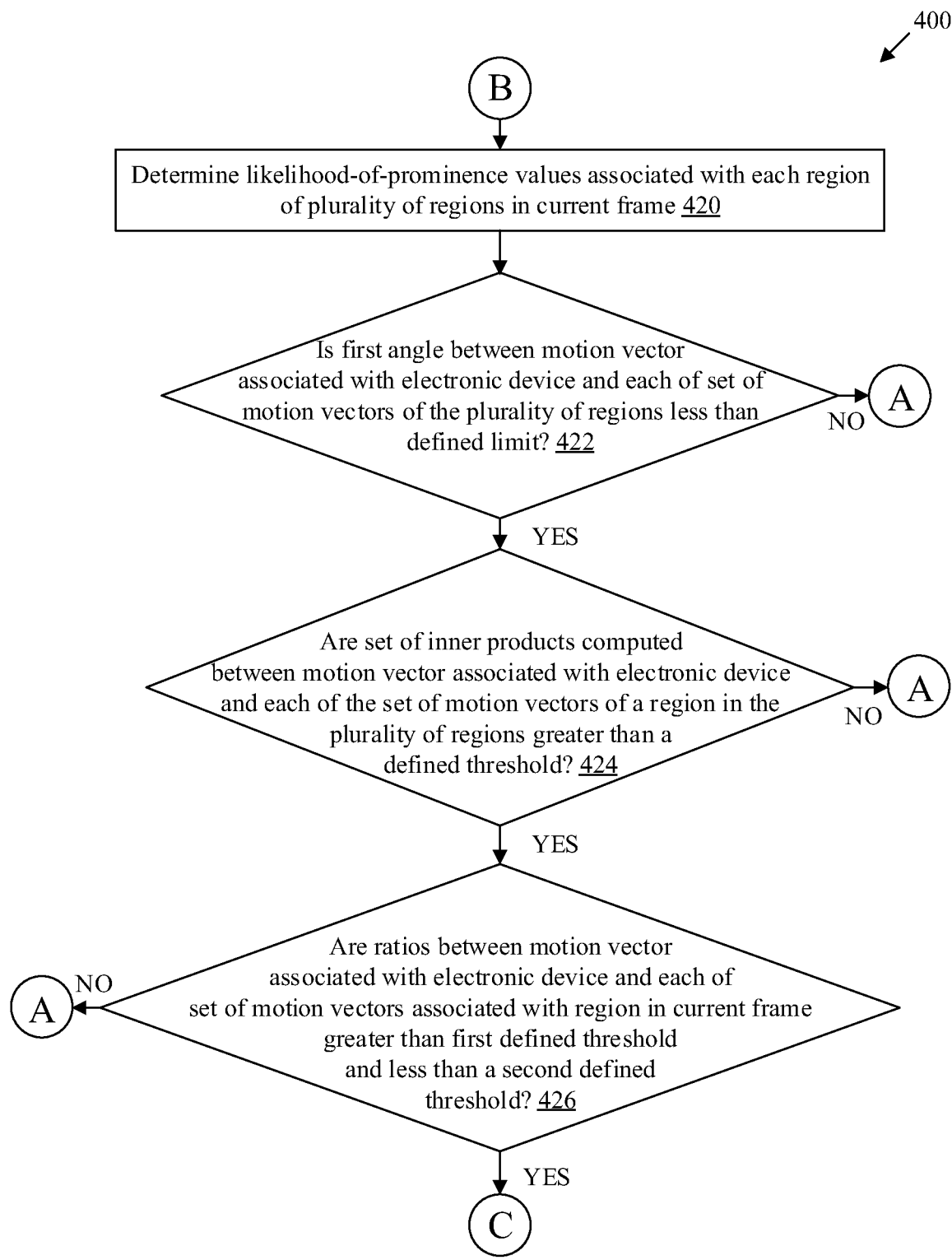
Figure 4C:
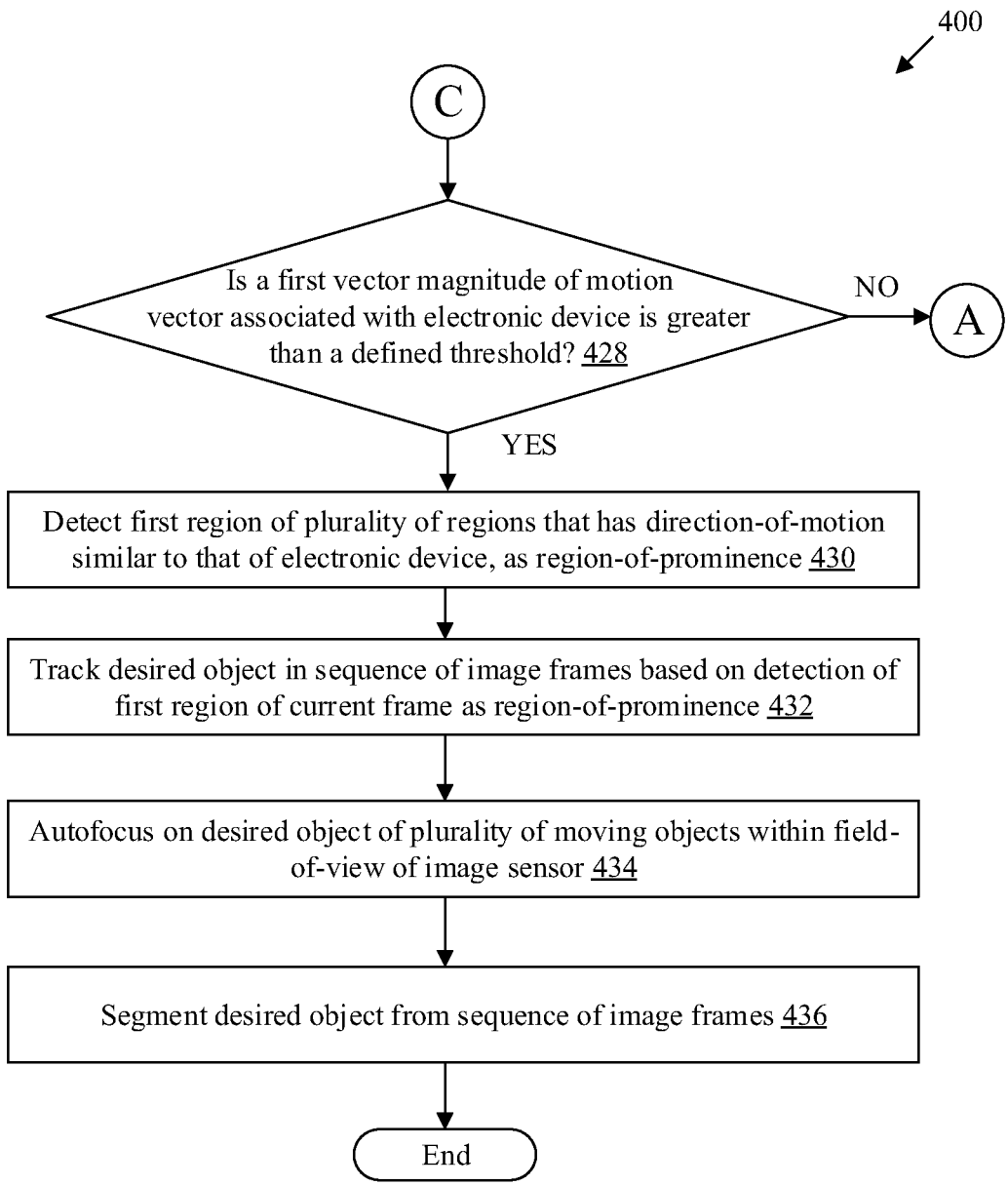

FIGS. 4A, 4B, and 4C, collectively, depict a flowchart that illustrates an exemplary method to track a desired object in a sequence of image frames based on optical flow information and motion sensor data, in accordance with an embodiment of the disclosure. With reference to FIG. 4A, there is shown a flow chart 400. The flow chart is described in conjunction with FIGS. 1, 2, 3A, 3B, 3C, 3D, and 3E. The method starts at 402 and proceeds to 404.

At 404, a sequence of image frames 104 within a field-of-view of the image sensor 226 may be captured. The image sensor 226 of the electronic device 102 may be configured to capture the sequence of image frames 104. For example, the electronic device 102 may be pointed at a certain direction such that the plurality of moving objects may be within the field-of-view of the electronic device 102. The electronic device 102 may be used to capture the sequence of image frames 104 that includes a current frame 104A and a previous frame 104B. The captured sequence of image frames 104 may comprise the plurality of moving objects, as discussed in FIG. 1.

At 406, a motion sensor-based motion vector associated with the electronic device 102 may be computed based on velocity information received from motion sensor of electronic device 102. The motion sensor 216 of the electronic device 102 may be configured to obtain the velocity information of the electronic device 102. Further, the motion sensor 216 of the electronic device 102 may be configured to compute the motion sensor-based motion vector associated with the electronic device 102.

At 408, it may be determined whether a vector magnitude of the motion sensor-based motion vector associated with the electronic device 102 is greater than a first defined threshold. The signal processor 204 may be configured to determine whether the vector magnitude of the motion sensor-based motion vector associated with the electronic device 102 is greater than the first defined threshold. In cases where the motion sensor-based motion vector is greater than the first defined threshold, control may pass to 410. Otherwise, control may pass to 404.

At 410, an optical flow map of the current frame 104A of the sequence of image frames 104 may be generated. The optical flow calculator 210 may be configured to generate the optical flow map. The optical flow map may be generated based on a difference of pixel values of a plurality of pixels in a region of the current frame 104A and a corresponding region of the previous frame 104B of the sequence of image frames 104. The generated optical flow map may comprise a plurality of regions (such as the first region 112A and the second region 114A), which may correspond to the plurality of moving objects captured in the sequence of image frames 104.

At 412, a plurality of motion vectors associated with the plurality of regions in the optical flow map may be extracted. The optical flow calculator 210 of the electronic device 102 may be configured to extract the plurality of motion vectors as discussed in FIG. 1. The one or more motion vectors associated with a region of the plurality of regions may indicate a relative motion of the respective region in comparison with other regions of the plurality of regions. For example, the plurality of motion vectors may include a set of motion vectors associated with the first region 112A. The electronic device 102 may be configured to compute an optical flow-based motion vector associated with the electronic device 102 based on the generated optical flow map. The optical flow-based motion vector may indicate a direction and a rate of an angular motion of the electronic device 102 as an orientation, a position, and a speed of movement of the electronic device 102 is changed by a user.

At 414, a motion vector associated with the electronic device 102 may be computed based on the optical flow-based motion vector and the motion sensor-based motion vector. The camera motion calculator 212 may be configured to compute the motion vector associated with the electronic device 102 based on the optical flow-based motion vector and the motion sensor-based motion vector.

At 416, a degree-of-similarity may be computed between the motion vector associated with the electronic device 102 and each of the plurality of motion vectors associated with a region of the plurality of region in the current frame 104A. The signal processor 204 may be configured to compute the degree-of-similarity between the motion vector associated with the electronic device 102 and each of the plurality of motion vectors associated with a region of the plurality of region in the current frame 104A. In accordance with an embodiment, the electronic device 102 may be configured to compute an angle between the motion vector associated with the electronic device 102 and each of the plurality of motion vectors of the plurality of regions. The electronic device 102 may be configured to compute the degree-of-similarity associated with each of the plurality of motion vectors (of the plurality of regions), based on the computed angle between the motion vector associated with the electronic device 102 and the respective motion vector. The electronic device 102 may be further configured to compute a ratio between the motion vector associated with the electronic device 102 and each of the plurality of motion vectors associated with a region of the plurality of region in the current frame 104A.

At 418, a plurality of inner products may be computed between the motion vector associated with the electronic device 102 and each of the plurality of motion vectors associated with a region of the plurality of region in the current frame 104A. The signal processor 204 of the electronic device 102 may be configured to compute the plurality of inner products between the motion vector associated with the electronic device 102 and each of the plurality of motion vectors associated with a region of the plurality of region in the current frame 104A.

At 420, likelihood-of-prominence values associated with each region of the plurality of regions of the current frame 104A may be determined. The signal processor 204 of the electronic device 102 may be configured to determine the likelihood-of-prominence values associated with each region of the plurality of regions. The electronic device 102 may be configured to determine the likelihood-of-prominence values associated with each region of the plurality of regions further based on the computed degree-of-similarity associated with the respective region. The electronic device 102 may be configured to detect the region-of-prominence, based on the determined likelihood-of-prominence values associated with each region of the plurality of regions. In certain scenarios, one or more operations such as a first operation 422, a second operation 424, a third operation 426, and a fourth operation 428 may be executed concurrently to each other. In such cases, the control may pass simultaneously to 422, 424, 426, and 428. In other scenarios, the first operation 422, the second operation 424, the third operation 426, and the fourth operation 428 may be executed sequentially. In such cases, the control may pass to 422.

At 422, it may be determined whether a first angle between the motion vector associated with the electronic device 102 and each of the plurality of motion vectors of the plurality of regions is lesser than a first defined limit. The signal processor 204 may be configured to determine whether the first angle is lesser than the first defined limit. In cases where the first angle between the motion vector associated with the electronic device 102 and each of the plurality of motion vectors of the plurality of regions is less than a first defined threshold, control may pass to 424. Otherwise, control may pass to 406.

At 424, it may be determined whether a set of inner products between the motion vector associated with the electronic device 102 and each of the set of motion vectors of the first region 112A is greater than a first defined threshold. The signal processor 204 may be configured to determine whether the set of inner products is greater than the first defined threshold. In cases where the set of inner products is greater than a first defined threshold, control may pass to 426. Otherwise, control may pass to 406.

At 426, it may be determined whether the computed ratio between the motion vector associated with the electronic device 102 and each of the set of motion vectors of the first region 112A in the current frame 104A is greater than a first defined threshold and lesser than a second defined threshold. The signal processor 204 may be configured to determine whether the computed ratio is greater than the first defined threshold and lesser than the second defined threshold. In cases where the computed ratio is greater than the first defined threshold and lesser than the second defined threshold, control may pass to 428. Otherwise, control may pass to 406.

At 428, it may be determined whether a first vector magnitude of the motion vector associated with the electronic device 102 is greater than a third defined threshold. The signal processor 204 may be configured to determine whether the first vector magnitude is greater than the third defined threshold. In cases where the first vector magnitude is greater than the third defined threshold, control may pass to 430. Otherwise, control may pass to 406.

At 430, the first region 112A of the plurality of regions that has the direction of motion similar to that of the electronic device 102 may be detected as the region-of-prominence. The signal processor 204 of the electronic device 102 may be configured to detect the first region 112A as the region-of-prominence. For example, the electronic device 102 may be configured to detect the first region 112A as the region-of-prominence based on the set of motion vectors associated with the first region 112A and the motion vector associated with the electronic device 102.

At 432, a desired object (such as the first object 108) in the sequence of image frames 104 may be tracked based on the detection of the first region 112A of the current frame 104A as the region-of-prominence. The circuitry 202 of the electronic device 102 may be configured to track the desired object (such as the first object 108) based on detection of the region-of-prominence from the plurality of regions. In cases where the first region 112A is detected as the region-of-prominence, the electronic device 102 may be configured to track the first object 108 based on the detection of the first region 112A of the current frame 104A as the region-of-prominence.

At 434, the electronic device 102 may autofocus on the desired object (such as the first object 108) within the field-of-view of the image sensor 226. The lens controller 228, and the lens driver 230 may be configured to adjust the plurality of lenses 236 to autofocus on the desired object. The desired object (for example, the first object 108) may be tracked to automatically adjust the electronic device 102 (such as a camera) to focus on the desired object (i.e. the first object 108).

At 436, the desired object may be segmented from the sequence of image frames 104. The desired object may be tracked to segment the desired object from the sequence of image frames 104. Control passes to end.

In accordance with an embodiment, an electronic device may comprise an image sensor and circuitry. The image sensor may be configured to capture a sequence of image frames of a scene. The circuitry may be configured to generate an optical flow map for a current frame of the sequence of image frames received from the image sensor. The optical flow map may comprise a plurality of regions that are mapped to a plurality of moving objects within a field-of-view of the image sensor. The circuitry may be configured to determine a plurality of likelihood-of-prominence values for the plurality of regions, based on the generated optical flow map and a motion vector that maps to a direction of motion of the electronic device. The circuitry may be configured to detect, from the plurality of regions, at least a first region that has a direction of motion similar to that of the electronic device, as a region-of-prominence, based on the determined plurality of likelihood-of-prominence values for the plurality of regions, wherein the first region maps to a desired object from the plurality of moving objects. The circuitry may be configured to track the desired object in the sequence of image frames based on the detection of the first region of the current frame as the region-of-prominence.

In accordance with an embodiment, the circuitry may be configured to compute the motion vector associated with the electronic device, based on an optical flow-based motion vector and a motion sensor-based motion vector. The electronic device may comprise a motion sensor. The circuitry may be configured to compute the motion sensor-based motion vector, based on angular velocity information obtained from the motion sensor. The circuitry may be further configured to extract a plurality of motion vectors that are mapped to the plurality of regions from the generated optical flow map. The circuitry may be configured to compute a degree-of-similarity between the motion vector associated with the electronic device and each of the plurality of motion vectors, based on an angle between the motion vector associated with the electronic device and each of the plurality of motion vectors. The plurality of likelihood-of-prominence values may be determined based on the degree-of-similarity between the motion vector associated with the electronic device and one or more motion vectors associated with a respective region of the plurality of regions. The first region from the plurality of regions may be detected as the region-of-prominence based on a highest value of the determined plurality of likelihood-of-prominence values that is associated with the first region in comparison with remaining likelihood-of-prominence values associated with other regions of the plurality of regions.

In accordance with an embodiment, the first region may be detected as the region-of-prominence based on a defined set of criteria. The circuitry may be further configured to determine as a first criteria of the defined set of criteria that a first angle between the motion vector associated with the electronic device and each of the set of motion vectors associated with the first region is less than a defined limit. The circuitry may be configured to determine, as a second criteria of the defined set of criteria that each inner product of a set of inner products is greater than a defined threshold. The set of inner products may be computed between the motion vector associated with the electronic device and different motion vectors associated with the first region.

In accordance with an embodiment, the circuitry may be configured to determine, as third criteria of the defined set of criteria that ratios between the motion vector associated with the electronic device and each of the set of motion vectors associated with the first region, are greater than a first defined threshold and less than a second defined threshold. The circuitry may be configured to determine as fourth criteria of the defined set of criteria that a first vector magnitude of the motion vector associated with the electronic device is greater than a defined threshold. The circuitry may be configured to autofocus on the desired object of the plurality of moving objects within the field-of-view of the image sensor, based on the detection of the first region as the region-of-prominence. The circuitry is further configured to segment the desired object from the sequence of image frames based on the track and detection of the first region as the region-of-prominence.

In accordance with an embodiment, an electronic device is disclosed. The electronic device (such as the electronic device 102 (FIG. 1)) may comprise an image sensor (such as the image sensor 226 (of FIG. 2)) and circuitry (such as the circuitry 202 (of FIG. 2)). The image sensor 226 may be configured to capture a sequence of image frames (such as the sequence of image frames 104 (of FIG. 1)) of a scene. The circuitry 202 may be configured to generate an optical flow map for a current frame of the sequence of image frames received from the image sensor. The optical flow map may comprise a plurality of regions that are mapped to a plurality of moving objects within a field-of-view of the image sensor. The circuitry 202 may be configured to determine a plurality of likelihood-of-prominence values for the plurality of regions, based on the generated optical flow map and a motion vector that maps to a direction of motion of the electronic device 102. The circuitry 202 may be configured to detect, from the plurality of regions, at least a first region (such as the first region 112A (of FIG. 1)) that has a direction of motion similar to that of the electronic device 102, as a region-of-prominence, based on the determined plurality of likelihood-of-prominence values for the plurality of regions. The first region 112A may map to a desired object from the plurality of moving objects. The circuitry may be configured to track the desired object in the sequence of image frames 104 based on the detection of the first region 112A of the current frame 104A as the region-of-prominence.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device 102 may cause the machine and/or computer to execute the operations that may include a capture of a sequence of image frames by an image sensor. The operations may further include a generation of an optical map of a current frame of the sequence of image frames by the circuitry. The optical flow map may include a plurality of regions that corresponds to a plurality of moving objects within a field-of-view of the image sensor. The operations may further include a detection of a first region of the plurality of regions that has a direction of motion similar to that of the electronic device. Thus, the first region may be detected as a region-of-prominence. The operations may further include a track of a desired object of the plurality of moving objects in the sequence of captured image frames, based on the detection of the first region of the current frame as the region-of-prominence. The operations when performed may enhance a functional efficiency of the electronic device 102 or the computer itself.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
an image sensor configured to capture a sequence of image frames of a scene; and
circuitry configured to:
receive the sequence of image frames from the image sensor;
generate an optical flow map for a current frame of the sequence of image frames, wherein
the optical flow map comprises a plurality of regions, and
the plurality of regions corresponds to a plurality of moving objects within a field-of-view of the image sensor;
determine a plurality of likelihood-of-prominence values for the plurality of regions based on the generated optical flow map and a device motion vector;

wherein the device motion vector corresponds to a direction of motion of the electronic device;
detect at least one region from the plurality of regions as a region-of-prominence based on the plurality of likelihood-of-prominence values for the plurality of regions, wherein
a direction of motion of the at least one region is same as the direction of motion of the electronic device, and
the at least one region maps to a desired object from the plurality of moving objects; and
track the desired object in the sequence of image frames based on the detection of the at least one region of the current frame as the region-of-prominence.

2. The electronic device of claim 1, wherein
the circuitry is further configured to compute the device motion vector, and
the device motion vector is computed based on an optical flow-based motion vector and a motion sensor-based motion vector.

3. The electronic device of claim 2, further comprises a motion sensor, wherein the circuitry is further configured to:
obtain angular velocity information from the motion sensor; and
compute the motion sensor-based motion vector based on the angular velocity information.

4. The electronic device of claim 2, wherein
the circuitry is further configured to extract a plurality of motion vectors based on the generated optical flow map, and
the plurality of motion vectors corresponds to the plurality of regions.

5. The electronic device of claim 4, wherein the circuitry is further configured to compute a degree-of-similarity between the device motion vector and each of the plurality of motion vectors based on an angle between the device motion vector and the each of the plurality of motion vectors.

6. The electronic device of claim 5, wherein
the circuitry is further configured to determine the plurality of likelihood-of-prominence values based on the degree-of-similarity between the device motion vector and at least one motion vector of the plurality of motion vectors, and
the at least one motion vector is associated with a respective region of the plurality of regions.

7. The electronic device of claim 6, wherein
the at least one region from the plurality of regions is associated with a specific likelihood-of-prominence value of the plurality of likelihood-of-prominence values,
the specific likelihood-of-prominence value is higher than likelihood-of-prominence values of regions of the plurality of regions other than the at least one region, and
the circuitry is further configured to detect the region-of-prominence based on the specific likelihood-of-prominence value.

8. The electronic device of claim 6, wherein
the circuitry is further configured to:
detect the at least one region as the region-of-prominence based on a set of criteria, and
determine a first criteria of the set of criteria based on an angle between the device motion vector and each of a set of motion vectors associated with the at least one region is less than a first threshold value.

9. The electronic device of claim 8, wherein
the circuitry is further configured to:
compute a set of inner products between the device motion vector and the each of the set of motion vectors associated with the at least one region; and
determine a second criteria of the set of criteria based on an inner product of the set of inner products is greater than a second threshold value.

10. The electronic device of claim 8, wherein the circuitry is further configured to determine a third criteria of the set of criteria based on a ratio between the device motion vector and a respective motion vector of the set of motion vectors is greater than a third threshold value and less than a fourth threshold value.

11. The electronic device of claim 10, wherein the circuitry is further configured to determine a fourth criteria of the set of criteria based on a first vector magnitude of the device motion vector is greater than a fifth threshold value.

12. The electronic device of claim 1, wherein the circuitry is further configured to autofocus on the desired object of the plurality of moving objects based on the detection of the at least one region as the region-of-prominence.

13. The electronic device of claim 1, wherein the circuitry is further configured to segment the desired object from the sequence of image frames based on the detection of the at least one region as the region-of-prominence.

14. A method, comprising:
in an electronic device, comprising an image sensor and circuitry:
capturing, by the image sensor, a sequence of image frames of a scene;
receiving, by the circuitry, the sequence of image frames from the image sensor;
generating, by the circuitry, an optical flow map for a current frame of the sequence of image frames, wherein
the optical flow map comprises a plurality of regions, and
the plurality of regions corresponds to a plurality of moving objects within a field-of-view of the image sensor;
determining, by the circuitry, a plurality of likelihood-of-prominence values for the plurality of regions based on the generated optical flow map and a device motion vector, wherein the device motion vector corresponds to a direction of motion of the electronic device;
detecting, by the circuitry, at least one region from the plurality of regions as a region-of-prominence based on the likelihood-of-prominence values, wherein
a direction of motion of the at least one region is same as the direction of motion of the electronic device, and
the at least one region maps to a desired object of the plurality of moving objects; and
tracking, by the circuitry, the desired object in the sequence of image frames based on the detection of the at least one region of the current frame as the region-of-prominence.

15. The method of claim 14, further comprising, computing, by the circuitry, the device motion vector, wherein
the device motion vector is computed based on an optical flow-based motion vector and a motion sensor-based motion vector.

16. The method of claim 15, wherein
the electronic device further comprises a motion sensor, and
the method further comprising:
obtaining, by the circuitry, angular velocity information from the motion sensor, and
computing, by the circuitry, the motion sensor-based motion vector based on the angular velocity information.

17. The method of claim 15, further comprising extracting, by the circuitry, a plurality of motion vectors based on the generated optical flow map, wherein the plurality of motion vectors corresponds to the plurality of regions.

18. The method of claim 17, further comprising computing, by the circuitry, a degree-of-similarity between the device motion vector and each of the plurality of motion vectors based on an angle between the device motion vector and the each of the plurality of motion vectors.

19. The method of claim 18, wherein
the at least one region from the plurality of regions is associated with a specific likelihood-of-prominence value of the plurality of likelihood-of-prominence values,
the specific likelihood-of-prominence value is higher than likelihood-of-prominence values of regions of the plurality of regions other than the at least one region, and
the circuitry is further configured to detect the region-of-prominence based on the specific likelihood-of-prominence value.

20. The method of claim 14, further comprising automatically focusing, by the circuitry, on the desired object of the plurality of moving objects based on the detection of the at least one region as the region-of-prominence.

* * * * *